United States Patent
Simmons et al.

(10) Patent No.: US 11,533,853 B2
(45) Date of Patent: Dec. 27, 2022

(54) AGRICULTURAL VEHICLE WITH AUTOMATIC MOTOR-DRIVEN COMPONENT CALIBRATION

(71) Applicant: CNH Industrial America LLC, New Holland, PA (US)

(72) Inventors: Scott C. Simmons, Lititz, PA (US); Carl Brewer, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 645 days.

(21) Appl. No.: 16/568,959

(22) Filed: Sep. 12, 2019

(65) Prior Publication Data

US 2021/0076571 A1    Mar. 18, 2021

(51) Int. Cl.
*A01F 15/07*    (2006.01)
*A01F 15/14*    (2006.01)

(52) U.S. Cl.
CPC ........ *A01F 15/0715* (2013.01); *A01F 15/141* (2013.01); *A01F 2015/076* (2013.01)

(58) Field of Classification Search
CPC .... A01F 15/07; A01F 15/071; A01F 15/0715; A01F 2015/076; A01F 2015/0775; A01F 15/141
USPC ..... 53/397, 399, 64, 77, 507, 508, 587, 210, 53/211; 100/3–5, 13, 15, 87–89
See application file for complete search history.

(56) References Cited

U.S. PATENT DOCUMENTS

| | | | |
|---|---|---|---|
| 4,022,120 A * | 5/1977 | McAllister | A01F 15/141 100/88 |
| 4,354,429 A * | 10/1982 | Boldenow et al. | A01F 15/141 100/88 |
| 4,514,955 A | 5/1985 | Mouser et al. | |
| 4,602,560 A | 7/1986 | Jacky | |
| 4,603,379 A * | 7/1986 | Strasser et al. | A01F 15/141 700/64 |
| 4,611,535 A | 9/1986 | Anstey et al. | |
| 4,624,180 A | 11/1986 | Strosser | |
| 4,656,931 A | 4/1987 | Van Den Bossche et al. | |
| 4,674,403 A | 6/1987 | Bryant et al. | |
| 4,931,967 A * | 6/1990 | Boe et al. | A01B 63/112 172/3 |

(Continued)

FOREIGN PATENT DOCUMENTS

DE           3640696 A1    6/1988
JP      2018171026 A  *  11/2018

*Primary Examiner* — Stephen F. Gerrity
(74) *Attorney, Agent, or Firm* — Peter Zacharias; Patrick Sheldrake

(57) ABSTRACT

A calibration system for an agricultural vehicle includes: a motor-driven component; a motor coupled to the motor-driven component and configured to move the motor-driven component between a maximum distance position and a home position; and a controller operatively coupled to the motor. The controller is configured to: enter a component calibration mode; output a first movement signal to the motor to cause the motor to carry the motor-driven component toward the maximum distance position; determine that the motor-driven component has reached the maximum distance position; output a second movement signal to the motor to cause the motor to carry the motor-driven component toward the home position; and determine that the motor-driven component has reached the home position.

17 Claims, 5 Drawing Sheets

(56) References Cited

U.S. PATENT DOCUMENTS

| | | | | |
|---|---|---|---|---|
| 5,152,123 | A | 10/1992 | Viaud et al. | |
| 5,231,828 | A | 8/1993 | Swearingen et al. | |
| 5,388,504 | A * | 2/1995 | Kluver | A01F 15/141 53/118 |
| 5,421,416 | A * | 6/1995 | Orbach et al. | A01B 63/1117 172/3 |
| 5,551,218 | A | 9/1996 | Henderson et al. | |
| 5,581,976 | A | 12/1996 | Underhill | |
| 5,615,544 | A | 4/1997 | Berger et al. | |
| 5,631,826 | A * | 5/1997 | Chow | A01F 15/071 700/84 |
| 5,687,548 | A | 11/1997 | McClure et al. | |
| 5,802,825 | A | 9/1998 | Chow et al. | |
| 5,855,109 | A * | 1/1999 | Vande Ryse et al. | A01F 15/0715 100/88 |
| 6,012,271 | A | 1/2000 | Wilkens et al. | |
| 6,035,773 | A | 3/2000 | Rempe | |
| 6,209,450 | B1 | 4/2001 | Naaktgeboren et al. | |
| 6,295,797 | B1 | 10/2001 | Naaktgeboren et al. | |
| 6,446,548 | B2 | 9/2002 | Chow | |
| 6,546,705 | B2 | 4/2003 | Scarlett et al. | |
| 6,615,114 | B1 | 9/2003 | Skiba et al. | |
| 6,644,006 | B1 | 11/2003 | Merritt et al. | |
| 6,675,561 | B2 | 1/2004 | Davis et al. | |
| 6,688,092 | B2 | 2/2004 | Anstey et al. | |
| 6,877,304 | B1 | 4/2005 | Smith et al. | |
| 7,908,822 | B2 | 3/2011 | McClure | |
| 7,918,072 | B2 | 4/2011 | McClure et al. | |
| 7,918,158 | B2 | 4/2011 | Viaud | |
| 8,011,295 | B1 | 9/2011 | Smith et al. | |
| 8,141,480 | B2 | 3/2012 | Smith | |
| 9,008,920 | B1 * | 4/2015 | Smith et al. | A01F 15/071 56/10.2 G |
| 9,706,716 | B2 | 7/2017 | Smith et al. | |
| 2002/0183103 | A1 * | 12/2002 | Anderson et al. | A01F 12/448 460/101 |
| 2009/0202327 | A1 | 8/2009 | Cory et al. | |
| 2016/0143225 | A1 * | 5/2016 | Smith et al. | A01F 15/141 701/50 |

* cited by examiner

AGRICULTURAL VEHICLE WITH AUTOMATIC MOTOR-DRIVEN COMPONENT CALIBRATION

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

To wrap the bale, the wrapping system executes a net wrapping cycle during which an actuator powers a rotating arm, also referred to as a duckbill, to move from a home position to an insert position to guide the net around the bale, and then to retract the duckbill from the insert position back to the home position once the bale is wrapped.

Various components of the agricultural vehicle, such as duckbills, twine arms or cutters, must be calibrated to efficiently operate. The calibration procedure involves the component being moved by a motor to various positions, such as a home position and a maximum position. To safely perform the calibration procedure, any operators, maintenance people, etc. should be outside of the vehicle interior. The calibration procedure is also prone to faults.

What is needed in the art is an agricultural vehicle that can address at least some of the previously described issues with known agricultural vehicles.

SUMMARY OF THE INVENTION

Exemplary embodiments disclosed herein provide a controller that is configured to determine when a motor-driven component is moved to a maximum distance position and a home position.

In some exemplary embodiments provided according to the present disclosure, a calibration system for an agricultural vehicle includes: a motor-driven component; a motor coupled to the motor-driven component and configured to move the motor-driven component between a maximum distance position and a home position; and a controller operatively coupled to the motor. The controller is configured to: enter a component calibration mode; output a first movement signal to the motor to cause the motor to carry the motor-driven component toward the maximum distance position; determine that the motor-driven component has reached the maximum distance position; output a second movement signal to the motor to cause the motor to carry the motor-driven component toward the home position; and determine that the motor-driven component has reached the home position.

In some exemplary embodiments provided according to the present disclosure, an agricultural vehicle includes: a chassis; a baling chamber carried by the chassis; a motor-driven component carried by the chassis; a motor coupled to the motor-driven component and configured to move the motor-driven component between a maximum distance position and a home position; and a controller operatively coupled to the motor. The controller is configured to: enter a component calibration mode; output a first movement signal to the motor to cause the motor to carry the motor-driven component toward the maximum distance position; determine that the motor-driven component has reached the maximum distance position; output a second movement signal to the motor to cause the motor to carry the motor-driven component toward the home position; and determine that the motor-driven component has reached the home position.

In some exemplary embodiments, a method of calibrating a motor-driven component of an agricultural vehicle is provided according to the present disclosure. The motor-driven component is coupled to a motor and movable to a maximum distance position and a home position. The method is performed by a controller and includes: outputting a first movement signal to the motor to move the motor-driven component to the maximum distance position; determining that the motor-driven component has reached the maximum distance position; outputting a second movement signal to the motor to move the motor-driven component to the home position; and determining that the motor-driven component has reached the home position.

One possible advantage that may be realized by exemplary embodiments disclosed herein is that the controller can automatically calibrate the motor-driven component to reduce the risk of operator error and/or injury.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Agricultural vehicles, such as round balers, are well known in the agricultural industry, and the present disclosure is applicable to substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety. It should be appreciated that while a round baler is described and illustrated, the present disclosure is equally applicable to other agricultural vehicles including but not limited to agricultural harvesters such as combine harvesters, sprayers, and seeders.

Figure 1:
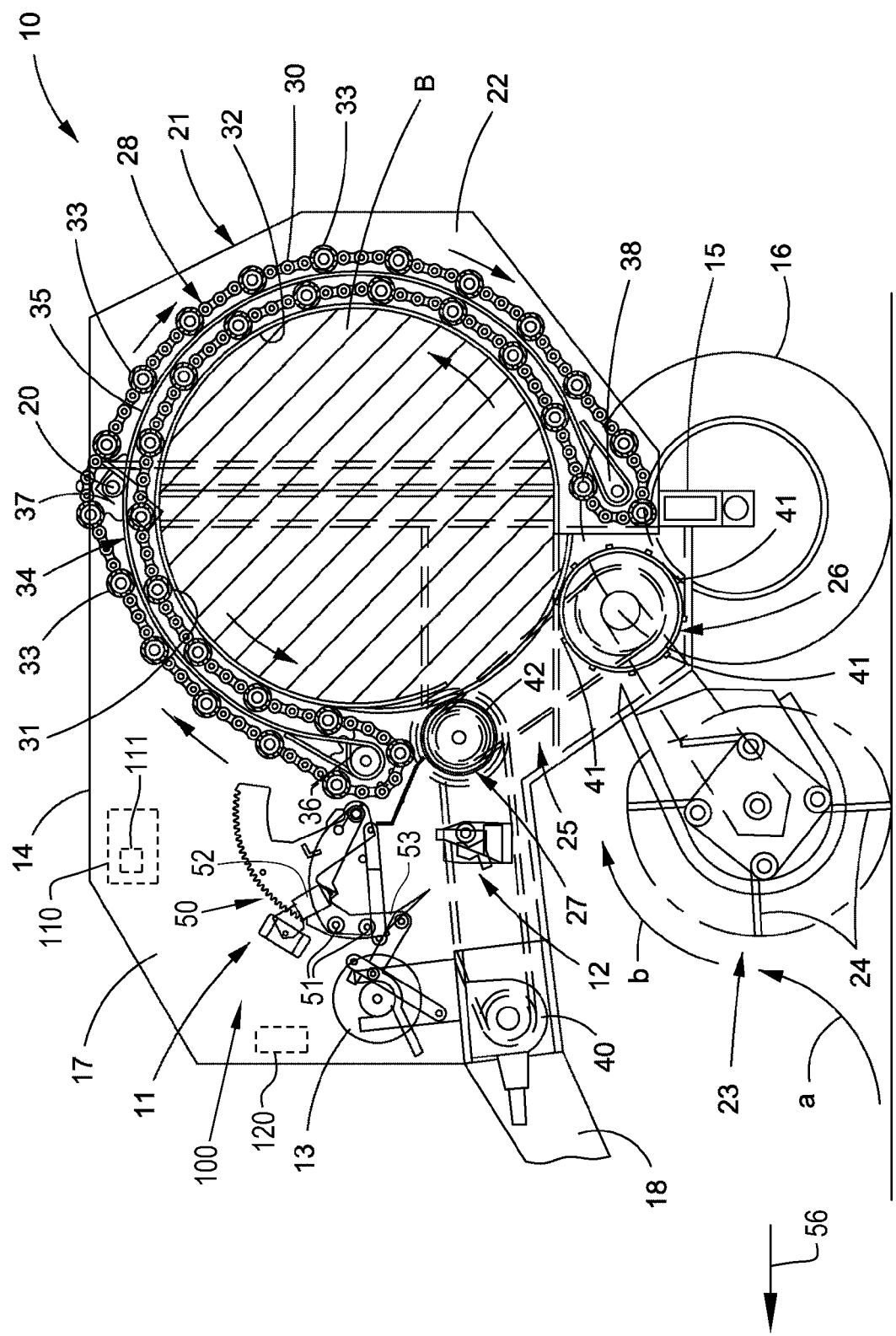
FIG. 1 illustrates a sectional view of an exemplary embodiment of an agricultural vehicle including a calibration system, provided in accordance with the present disclosure.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 illustrates a fixed chamber round baler 10 having a wrapping system for wrapping a cylindrical package of crop material (not shown) formed in a round baler 10. More particularly, the wrapping system of baler 10 comprises a wrapping assembly 11 and a cutting assembly 12 for cutting wrapping material, such as net, issued from a material roll 13.

As shown, round baler 10 includes a chassis 14 with a main support beam 15 on which a pair of wheels 16 (only one shown) are rotatably affixed. The chassis carries a cylindrical baling chamber including sidewalls 17. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on chassis 14 in a suitable manner includes a plurality of fingers or tines 24 movable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on chassis 14 between sidewalls 17.

As shown, the baling chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The baling chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the baling chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

As shown, the wrapping assembly 11 includes a material roll 13, a duckbill assembly 50 including at least one duckbill roll, illustrated as multiple duckbill rolls 51, carried by a duckbill 53, and a duckbill motor 52 coupled to the duckbill 53.

The wrapping assembly 11, including the duckbill assembly 50 and its associated structure and mechanisms may be conventional and common to the structure and operation described in the baler patents referenced and incorporated herein by reference above.

As shown, the duckbill motor 52 may be dedicated to the duckbill 53, and operation of the duckbill motor 52 functions to insert the duckbill 53 to commence a net wrapping cycle and then to retract the duckbill 53 at the end of the wrapping cycle once the net has been cut. The duckbill motor 52 is thus configured to move the duckbill 53 between a first position, which may be a maximum distance position, and a second position, which may be a home position, during retraction of the duckbill 53. The duckbill motor 52 may be, for example, a motor that is powered by electricity, hydraulics, and/or pneumatics, as is known.

In known agricultural vehicles, the operator has to manually calibrate components of the vehicle, such as the duckbill. This calibration generally involves the operator manually pressing a switch or icon to enter a calibration mode and then controlling the calibration. For example, the operator may need to press and/or hold a switch to move the component to a maximum distance position; once the operator believes that the component has reached the maximum distance position, the operator presses an icon and/or switch to indicate that the component has reached the maximum distance position. The operator must then follow a similar procedure to indicate that the component has reached the home position. This procedure is prone to inaccuracies because the operator often has no reliable way of knowing when the component has reached the maximum distance position and/or the home position while the operator is sitting in the cab. Further, known agricultural vehicles do not reliably provide the operator with enough information to determine when the component has reached the positions of interest. These factors result in calibrations that are inaccurate and cause inefficient operation of the vehicle.

To address some of the previously described issues, an exemplary embodiment of a calibration system 100 is provided according to the present disclosure. The calibration system 100 includes a motor-driven component, such as the duckbill 53, a motor, such as the duckbill motor 52, coupled to the motor-driven component 53, and a controller 110 that is operatively coupled to the duckbill motor 52. The controller 110 is configured to enter a component calibration mode, which can be used to calibrate the duckbill motor 52 and/or the controller 110 for operational use. It should be appreciated that while the duckbill 53 is illustrated and described as the motor-driven component, other components can also be the motor-driven component such as, for example, a twine arm or a cutter.

Figure 2:
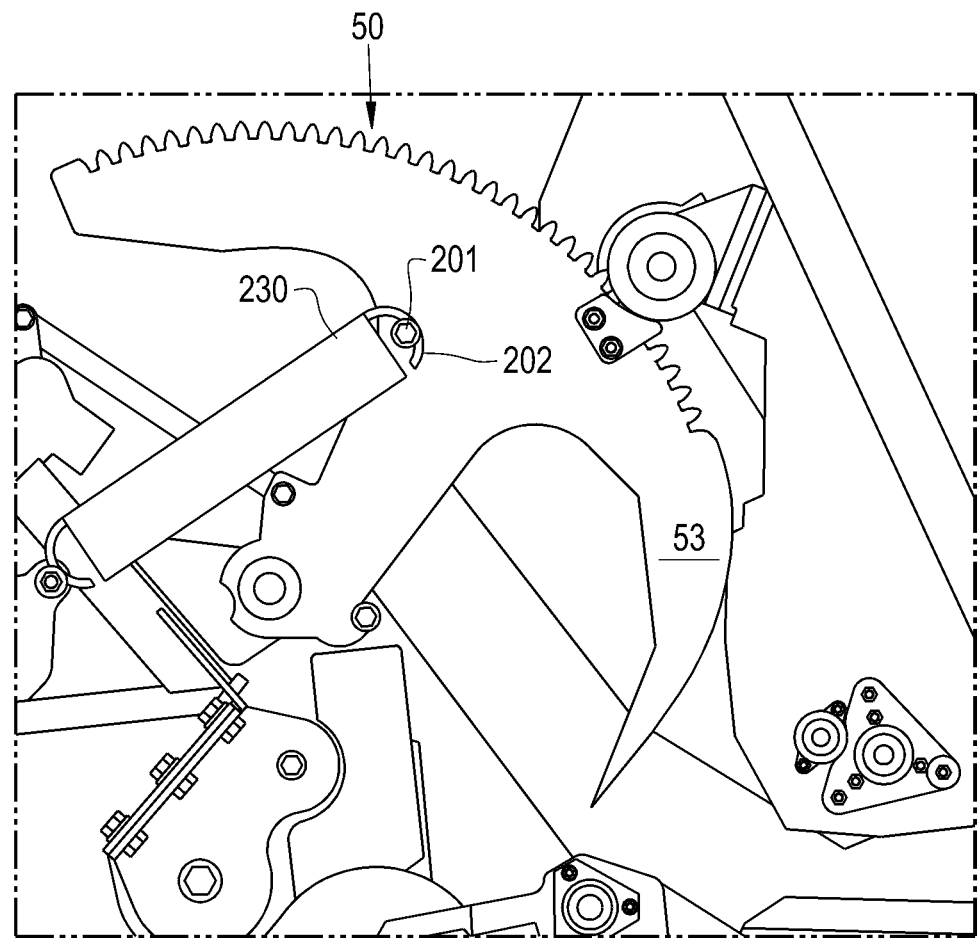
FIG. 2 illustrates a side view of an exemplary embodiment of a motor-driven component in a home position.
Figure 3:
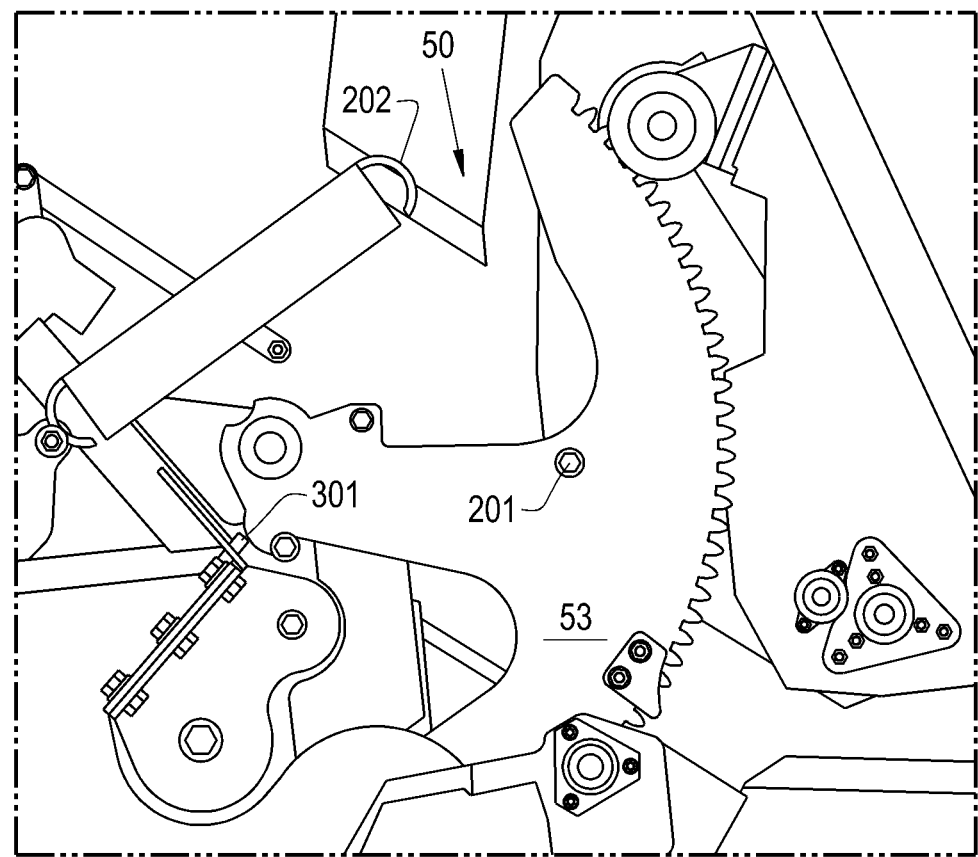
FIG. 3 illustrates a side view of the motor-driven component after being moved by a motor to a maximum distance position.
Figure 4:
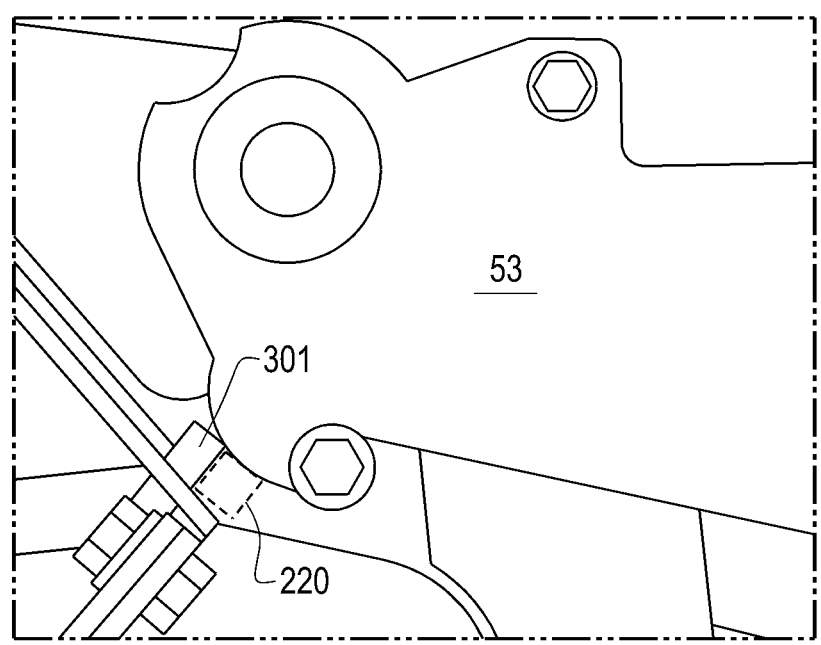
FIG. 4 illustrates a close-up perspective view of a stop preventing further movement of the motor-driven component.

Referring now to FIGS. 2-4, operation of the duckbill motor 52 during calibration is illustrated. The duckbill 53 may start in the home position, which is illustrated in FIG. 2, or a different position. The controller 110 outputs a first movement signal to the duckbill motor 52 to cause the duckbill motor 52 to carry the duckbill 53 toward the maximum distance position, which is illustrated in FIGS. 3-4 and may correspond to an insert position of the duckbill 53. The controller 110 is configured to determine that the duckbill 53 has reached the maximum distance position, which may be done in a variety of ways as described further herein. The controller 110 outputs a second movement signal to the duckbill motor 52 to cause the duckbill motor 52 to carry the duckbill 53 toward the home position. In some embodiments, the second movement signal causes the duckbill motor 52 to carry the duckbill 53 in a direction opposite to the direction the duckbill motor 52 carries the duckbill 53 after receiving the first movement signal. The controller 110 then determines that the duckbill 53 has reached the home position, which may be done in a variety of ways as described further herein. It should be appreciated that while the controller 110 is described as outputting a "first" movement signal and a "second" movement signal, the description of "first" and "second" is not intended to refer to a temporal ordering of the movement signals being output, i.e., in some embodiments, the controller 110 outputs the second movement signal prior to outputting the first movement signal.

Figure 5:
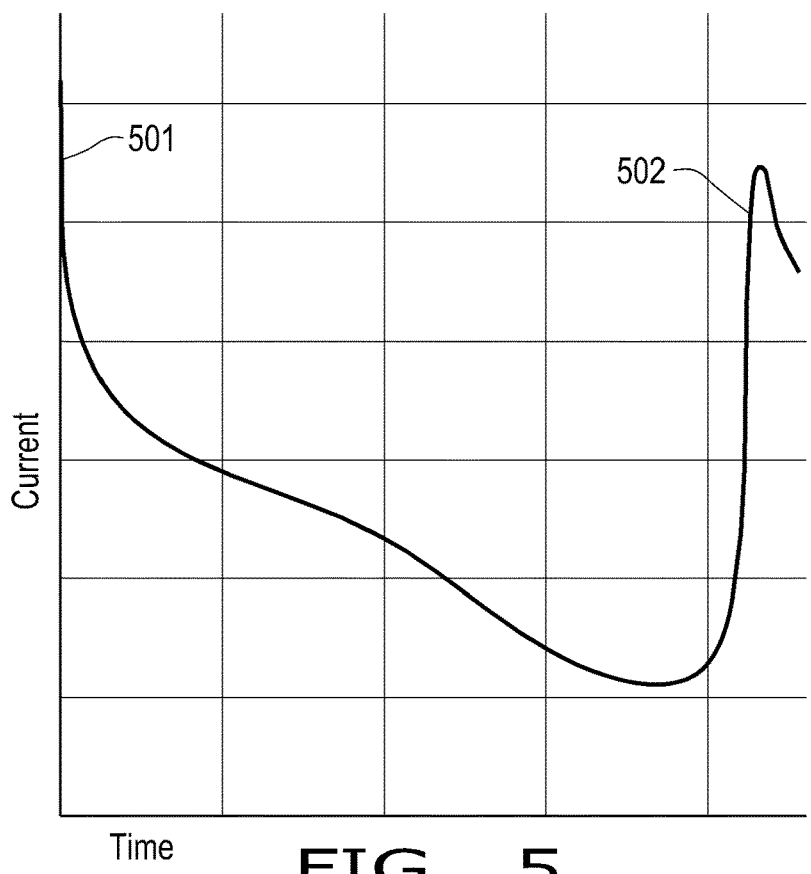
FIG. 5 is a graphical representation of an exemplary time-current plot obtained during movement of the motor-driven component.

In some embodiments, and referring now to FIG. 5 as well, the controller 110 is configured to determine that the duckbill 53 has reached the maximum distance position and the home position by sensing the presence of a current spike at each respective position. As illustrated in FIG. 5, for example, a first current spike 501 sensed by the controller 110 may be caused by an edge of the duckbill 53 abutting an insert position stop 301 (illustrated in greater detail in FIGS. 3 and 4), which prevents the duckbill 53 from advancing further. The sensed current spike 501 may be due to the duckbill motor 52 attempting to draw more current and overcome the physical resistance caused by the abutment between the duckbill 53 and the insert position stop 301. In this respect, the controller 110 can determine that the duckbill 53 has reached at least one of the end positions, i.e., the home position or the maximum distance position, due to sensing the current spike. The controller 110 can then output the other movement signal so the duckbill motor 52 carries the duckbill 53 to a position where a second current spike 502 is sensed by the controller 110. The second current spike 502 may be sensed by the controller 110 when a projection 201 of the duckbill 53 abuts a home position stop 202 (illustrated in FIG. 2), preventing the duckbill 53 from advancing further. The controller 110 may be configured to control a supply of electrical power to the duckbill motor 52 through, e.g., a control area network (CAN) bus, so the controller 110 can constantly monitor the current drawn by the duckbill motor 52 and also sense current spikes at the duckbill motor 52. In some embodiments, the controller 110 can sense the current spikes 501, 502 by receiving signals from one or more current sensors. It should thus be appreciated that the controller 110 can sense current spikes 501, 502 in a variety of ways to determine that the duckbill 53 has reached the maximum distance position and the home position.

In some embodiments, and referring specifically now to FIGS. 2-4, the calibration system 100 includes a first position sensor 220 that is operatively coupled to the controller 110 and configured to output a maximum distance position signal to the controller 110 when the duckbill 53 reaches the maximum distance position. The first position sensor 220 may be, for example, coupled to the insert position stop 301 and include a button that is depressed when contacted by the edge of the duckbill 53. When the button is depressed, the first position sensor 220 outputs the maximum distance position signal to the controller 110 so the controller 110 can determine that the duckbill 53 has reached the maximum distance position. Similarly, the calibration system 100 can also include a second position sensor 230 that is operatively coupled to the controller 110 and configured to output a home position signal to the controller 110 when the duckbill 53 reaches the home position. The second position sensor 230 may, for example, be coupled to the home position stop 202 including a hook that is pulled by the projection 201 when the duckbill 53 reaches the home position, with pulling of the hook causing the second position sensor 230 to output the home position signal to the controller 110 so the controller 110 can determine the duckbill 53 has reached the home position. It should be appreciated that the described position sensors 220, 230 are exemplary only and other types of sensors can be coupled to the controller 110 to determine when the duckbill 53 has reached the respective end positions. Such sensors include, but are not limited to, optical sensors, angular sensors, Hall effect sensors, etc.

Figure 6:
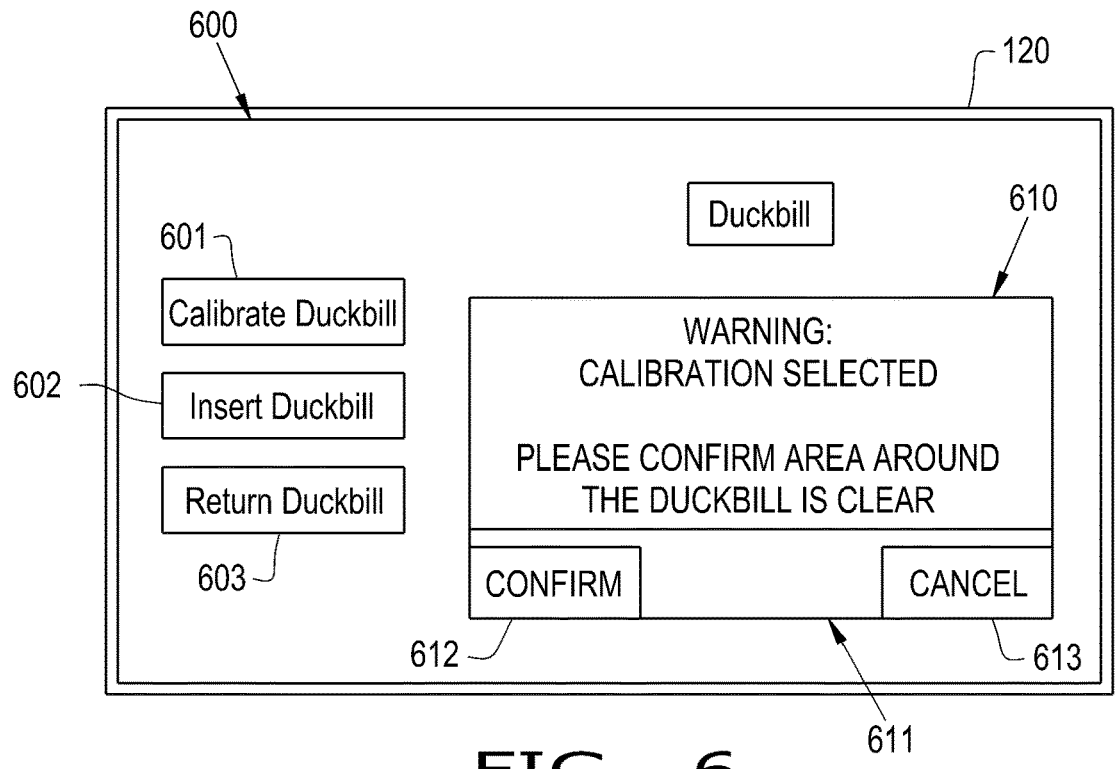
FIG. 6 is an illustration of an exemplary graphical user interface presented on a display, provided in accordance with the present disclosure.

In some embodiments, and referring now to FIG. 6 as well, a display 120 is operatively coupled to the controller 110. The display 120 may be disposed, for example, in an operator cabin of a towing vehicle or on area of the vehicle 10 that is accessible by an operator. The display 120 can present a graphical user interface (GUI) 600 that presents an operator with a plurality of icons 601, 602, 603 that can be selected to obtain information about operation of the vehicle 10 and/or control operation of the vehicle 10, as is known. One of the icons 601, for example, may be a calibrate icon 601 that causes the display 120 to output a calibration start signal to the controller 110 when selected. Upon receiving the calibration start signal, the controller 110 can enter the component calibration mode. In some embodiments, the controller 110 outputs a safety query signal to the display 120 after receiving the calibration start signal, but prior to outputting the first movement signal or outputting the second movement signal, so the display 120 presents a safety warning menu 610. The safety warning menu 610 may alert an operator that calibration is about to begin and warn the operator to ensure that the area around the duckbill 53 is clear to reduce the risk of injury. In some embodiments, a confirmation menu 611 accompanies the warning menu 610 and has a confirmation icon 612 that must be selected by an operator before the controller 110 enters the component calibration mode and/or outputs either of the movement signals. The confirmation menu 611 may also have a cancel icon 613 that, when selected, causes the controller 110 to leave the component calibration mode and/or not output either of the movement signals. It should thus be appreciated that the controller 110 and the display 120 provided according to the present disclosure can warn an operator before the calibration of the duckbill 53 begins so the operator can reduce the risk of injury due to the area around the duckbill 53 not being clear.

In some embodiments, the controller 110 is further configured to record at least one first parameter corresponding to the duckbill 53 reaching the maximum distance position and record at least one second parameter corresponding to the duckbill 53 reaching the home position. These recordings may be stored, for example, in a memory 111 of the controller 110, which may also store machine code for the controller 110 in the form of software. The first parameter(s) and/or the second parameter(s) may be, for example, respective angular positions of the duckbill motor 52 so the controller 110 is able to determine the angular displacement between the maximum distance position and the home position. Alternatively or in addition, the controller 110 can be configured to record an amount of time that it takes for the duckbill motor 52 to carry the duckbill 53 between the home position and the maximum distance position so the controller 110 is able to coordinate movements of various elements of the baler 10. It should thus be appreciated that the controller 110 can be configured to record many different kinds of parameters to assist an operator in controlling the functions of the vehicle 10. Once the controller 110 records the parameters, the controller 110 can compare function of the vehicle 10 during operation to the recorded parameters to, for example, determine if the vehicle 10 is operating within a safe operating range.

From the foregoing, it should be appreciated that the controller 110 provided according to the present invention can automatically calibrate motor-driven components, such as a duckbill, by controlling the motor that moves the component and determining that the component has reached certain positions. This automatic calibration removes the requirement for an operator to manually calibrate the component, which is prone to error for a variety of reasons. The controller 110 can determine that the component has reached the positions in a variety of ways, allowing the controller 110 to be adaptable to many different system setups. Thus, the controller 110 provides a convenient, reliable, and versatile way for an operator to calibrate various components of the agricultural vehicle 10.

Figure 7:
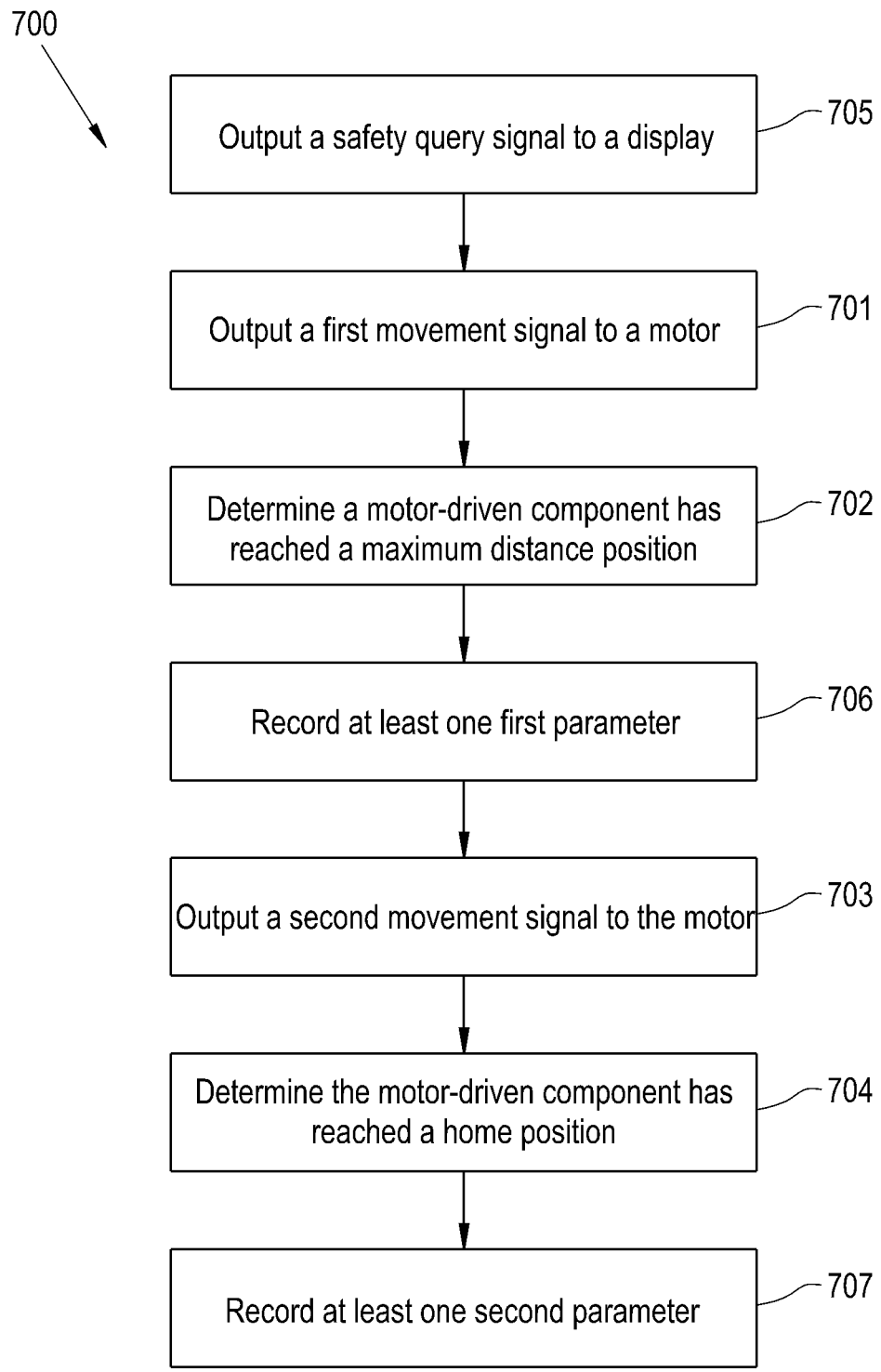
FIG. 7 illustrates a flowchart of an exemplary embodiment of a method of calibrating a motor-driven component, provided in accordance with the present disclosure.

Referring now to FIG. 7, an exemplary embodiment of a method of calibrating a motor-driven component, such as a duckbill 53, of an agricultural vehicle 10 provided according to the present disclosure is illustrated. The duckbill 53 is coupled to a duckbill motor 52 and movable to a maximum distance position and a home position. The method 700 is performed by a controller 110 and includes outputting 701 a first movement signal to the duckbill motor 52 to move the duckbill 53 to the maximum distance position. The controller 110 determines 702 that the duckbill 53 has reached the maximum distance position. The controller 110 outputs 703 a second movement signal to the duckbill motor 52 to move the duckbill 53 to the home position. In some embodiments, the first movement signal causes the duckbill motor 52 to move the duckbill 53 in a first direction and the second movement signal causes the duckbill motor 52 to move the duckbill 53 in a second direction that is opposite to the first direction. The controller 110 determines 704 that the duckbill 53 has reached the home position. As previously described, the controller 110 can determine 702, 704 that the duckbill 53 has reached each respective position in a variety of ways. In some embodiments, the controller 110 determines 702, 704 that the duckbill 53 has reached the maximum distance position and/or the home position by sensing the presence of a current spike 501, 502 corresponding to the duckbill 53 reaching the respective position. Prior to outputting 701, 703 one or both of the movement signals, the controller 110 can output 705 a safety query signal to a display 120 so an operator can verify that the area around the duckbill 53 is clear. In some embodiments, the controller 110 also records 706 at least one first parameter corresponding to the duckbill 53 reaching the maximum distance position and records 707 at least one second parameter corresponding to the duckbill 53 reaching the home position.

It is to be understood that the steps of the method 700 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the method 700, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A calibration system for an agricultural vehicle, comprising:
   a motor-driven component;
   a motor coupled to the motor-driven component and configured to move the motor-driven component between a maximum distance position and a home position; and
   a controller operatively coupled to the motor, the controller being configured to:
      enter a component calibration mode;
      output a first movement signal to the motor to cause the motor to move the motor-driven component toward the maximum distance position;
      determine that the motor-driven component has reached the maximum distance position;
      output a second movement signal to the motor to cause the motor to move the motor-driven component toward the home position;
      output a safety query signal to a display prior to outputting the first movement signal or outputting the second movement signal, wherein a confirmation icon presented on the display must be selected before the controller outputs the first movement signal or the second movement signal; and
      determine that the motor-driven component has reached the home position.

2. The calibration system of claim 1, wherein the controller is configured to determine that the motor-driven component has reached the maximum distance position and the home position by sensing the presence of a current spike at each respective position.

3. The calibration system of claim 2, wherein the controller is configured to control a supply of electrical power to the motor.

4. The calibration system of claim 1, further comprising a first position sensor that is operatively coupled to the controller and configured to output a maximum distance position signal to the controller when the motor-driven component reaches the maximum distance position.

5. The calibration system of claim 4, further comprising a second position sensor that is operatively coupled to the controller and configured to output a home position signal to the controller when the motor-driven component reaches the home position.

6. The calibration system of claim 1, wherein the motor-driven component is a duckbill, a twine arm, or a cutter.

7. The calibration system of claim 1, wherein the controller is further configured to record at least one first parameter corresponding to the motor-driven component reaching the maximum distance position and record at least one second parameter corresponding to the motor-driven component reaching the home position.

8. An agricultural vehicle, comprising:
   a chassis;
   a baling chamber carried by the chassis;
   a motor-driven component carried by the chassis;
   a motor coupled to the motor-driven component and configured to move the motor-driven component between a maximum distance position and a home position;
   a display; and
   a controller operatively coupled to the motor and the display, the controller being configured to:
      enter a component calibration mode;
      output a first movement signal to the motor to cause the motor to move the motor-driven component toward a maximum distance position;
      determine that the motor-driven component has reached the maximum distance position;
      output a home movement signal to the motor to cause the motor to move the motor-driven component toward the home position;
      output a safety query signal to the display prior to outputting the first movement signal or outputting the home movement signal, wherein a confirmation icon presented on the display must be selected before the controller outputs the first movement signal or the home movement signal; and
      determine that the motor-driven component has reached the home position.

9. The agricultural vehicle of claim 8, wherein the controller is configured to determine that the motor-driven component has reached the maximum distance position and the home position by sensing the presence of a current spike at each respective maximum distance position.

10. The agricultural vehicle of claim 9, wherein the controller is configured to control a supply of electrical power to the motor.

11. The agricultural vehicle of claim 8, further comprising a first position sensor that is operatively coupled to the controller and configured to output a maximum distance position signal to the controller when the motor-driven component reaches the maximum distance position.

12. The agricultural vehicle of claim 11, further comprising a second position sensor that is operatively coupled to the controller and configured to output a home position signal to the controller when the motor-driven component reaches the home position.

13. The agricultural vehicle of claim 8, wherein the motor-driven component is a duckbill, a twine arm, or a cutter.

14. The agricultural vehicle of claim 8, wherein the controller is further configured to record at least one first parameter corresponding to the motor-driven component reaching the maximum distance position and record at least one second parameter corresponding to the motor-driven component reaching the home position.

15. A method of calibrating a motor-driven component of an agricultural vehicle, the motor-driven component being coupled to a motor and movable to a maximum distance position and a home position, the method being performed by a controller and comprising:
   outputting a first movement signal to the motor to move the motor-driven component to the maximum distance position;
   determining that the motor-driven component has reached the maximum distance position;
   outputting a second movement signal to the motor to move the motor-driven component to the home position;
   outputting a safety query signal to a display prior to outputting the first movement signal or outputting the second movement signal, wherein a confirmation icon presented on the display must be selected before the controller outputs the first movement signal or the second movement signal; and
   determining that the motor-driven component has reached the home position.

16. The method of claim 15, wherein determining that the motor-driven component has reached the maximum distance position or determining that the motor-driven component has reached the home position comprises sensing the presence of a current spike corresponding to the motor-driven component reaching the maximum distance position or the home position.

17. The method of claim 15, further comprising:
recording at least one first parameter corresponding to the motor-driven component reaching the maximum distance position; and
recording at least one second parameter corresponding to the motor-driven component reaching the home position.

* * * * *